United States Patent
Drube

(10) Patent No.: US 10,288,367 B2
(45) Date of Patent: May 14, 2019

(54) COOLING OF CRYOGENIC METERS SENSING REVERSE FLOW

(71) Applicant: Chart Inc., Ball Ground, GA (US)

(72) Inventor: Paul Drube, San Diego, CA (US)

(73) Assignee: Chart, Inc, Ball Ground, GA (US)

( * ) Notice: Subject to any disclaimer, the term of this patent is extended or adjusted under 35 U.S.C. 154(b) by 1374 days.

(21) Appl. No.: 14/208,128

(22) Filed: Mar. 13, 2014

(65) Prior Publication Data

US 2014/0262131 A1  Sep. 18, 2014

Related U.S. Application Data

(60) Provisional application No. 61/794,615, filed on Mar. 15, 2013.

(51) Int. Cl.
| | | |
|---|---|---|
| *F25D 3/10* | (2006.01) | |
| *F28F 27/02* | (2006.01) | |
| *G01F 1/84* | (2006.01) | |

(52) U.S. Cl.
CPC .......... *F28F 27/02* (2013.01); *F25D 3/10* (2013.01); *G01F 1/8472* (2013.01)

(58) Field of Classification Search
CPC .......... F17C 13/04; F17C 2205/0326; F17C 2205/0332; F17C 2265/025; F17C 2227/0341; F17C 2227/0135; F17C 2250/0443; F17C 2250/0636; F17C 2227/0185

(Continued)

(56) References Cited

U.S. PATENT DOCUMENTS

| | | | | |
|---|---|---|---|---|
| 3,521,458 A | * | 7/1970 | Hemstreet | ............... F25J 1/001 |
| | | | | 62/354 |
| 3,580,045 A | * | 5/1971 | Pfrehm | ............... G01F 25/0015 |
| | | | | 137/625.28 |

(Continued)

FOREIGN PATENT DOCUMENTS

| | | |
|---|---|---|
| EP | 1184616 A2 | 3/2002 |
| WO | WO-2012/170020 A1 | 12/2012 |

OTHER PUBLICATIONS

Continuous Production of Fatty Acid Ethyl Esters from Soybean Oil in Compressed Ethanol, 2007.*

(Continued)

*Primary Examiner* — Frantz F Jules
*Assistant Examiner* — Nelson J Nieves
(74) *Attorney, Agent, or Firm* — Cook Alex Ltd.; R. Blake Johnston

(57) ABSTRACT

Cooling of a meter by liquid flowing in a flow that is reverse from dispensing flow is described. A plurality of tubes is configured to transport a plurality of fluids comprising a first fluid and a second fluid. Dispense valves attached to corresponding tubes are configured to open when the first fluid is dispensed from a pump to a first outlet. Recirculation valves attached to respective tubes are configured to open when the second fluid is transported from the pump to a second outlet. A meter attached to a tube of the plurality of tubes is configured to measure properties of a fluid when the fluid flows through the tube, wherein the fluid is one of the first fluid and the second fluid. The meter is configured to sense reverse flow when the second fluid flows from the outlet section to the inlet section.

20 Claims, 11 Drawing Sheets

(58) Field of Classification Search
USPC ...... 137/487.5, 339, 565.01, 565.11, 565.16, 137/861, 862, 870, 883
See application file for complete search history.

(56) References Cited

U.S. PATENT DOCUMENTS

| | | | | | |
|---|---|---|---|---|---|
| 3,717,166 | A | * | 2/1973 | Davies | F15C 1/22 137/814 |
| 3,721,256 | A | * | 3/1973 | Barnard | B67D 7/36 137/409 |
| 5,616,838 | A | | 4/1997 | Preston et al. | |
| 5,771,946 | A | * | 6/1998 | Kooy | F17C 6/00 141/11 |
| 2001/0025655 | A1 | | 10/2001 | Yoshida et al. | |
| 2002/0153041 | A1 | * | 10/2002 | Drube | F16K 13/04 137/68.3 |
| 2003/0159741 | A1 | * | 8/2003 | Sparks | A61M 5/16827 137/814 |
| 2009/0112164 | A1 | * | 4/2009 | Reilly | A61M 5/16827 604/151 |
| 2009/0277278 | A1 | * | 11/2009 | Koudal | G01F 1/8431 73/861.08 |
| 2010/0139782 | A1 | * | 6/2010 | Deline | B67D 7/16 137/87.03 |
| 2010/0199565 | A1 | * | 8/2010 | Domholt | F15B 15/18 49/358 |
| 2010/0257943 | A1 | * | 10/2010 | Huber | G01F 1/74 73/861.357 |
| 2011/0088811 | A1 | * | 4/2011 | Shudo | F02D 19/0647 141/248 |
| 2011/0259426 | A1 | * | 10/2011 | Cramer | F17C 13/045 137/1 |
| 2012/0081031 | A1 | * | 4/2012 | Kameyama | H03K 17/941 315/291 |
| 2012/0137708 | A1 | * | 6/2012 | Mackey | F17C 7/02 62/50.1 |
| 2012/0255371 | A1 | * | 10/2012 | Rieder | G01F 1/8404 73/861.357 |
| 2012/0315152 | A1 | * | 12/2012 | Baker | F04B 49/22 417/53 |
| 2014/0174542 | A1 | * | 6/2014 | Jansson | A61M 1/30 137/1 |
| 2014/0208871 | A1 | * | 7/2014 | Hays | G01F 1/72 73/861.355 |
| 2014/0261326 | A1 | * | 9/2014 | Windbergs | F02M 35/10216 123/445 |
| 2015/0052968 | A1 | * | 2/2015 | Day | G01F 25/0007 73/1.19 |
| 2015/0059451 | A1 | * | 3/2015 | Witt | B01L 3/502784 73/61.55 |
| 2016/0298992 | A1 | * | 10/2016 | Pathier | G01F 1/74 |

OTHER PUBLICATIONS

International Search Report and Written Opinion issued in International Application No. PCT/US2014/026520, dated Jul. 23, 2014.

* cited by examiner

COOLING OF CRYOGENIC METERS SENSING REVERSE FLOW

RELATED APPLICATION

This patent application claims priority to U.S. Provisional Patent Application Ser. No. 61/794,615, which is entitled "Cooling Of Cryogenic Meters Sensing Reverse Flow" and was filed on Mar. 15, 2013, contents of which are incorporated by reference in entirety.

TECHNICAL FIELD

The subject matter described herein relates to cooling of one or more cryogenic meters that can detect reverse flow of liquid flowing though those one or more cryogenic meters.

BACKGROUND

Cryogenic liquids are liquefied gases that are kept in their liquid states at significantly low temperatures. For example, some cryogenic liquids have boiling points below negative 150 degrees Celsius (that is, −150° C.). Cryogenic liquids can be used as fuels. For example, liquid hydrogen, which is an example of a cryogenic liquid, can be used as a rocket fuel. For such cryogenic liquids to be used, cryogenic liquids are transported in tubes. Cryogenic meters are placed in the tubes to measure a flow of the cryogenic liquids. Because the cryogenic liquids are required to remain in a liquid state at very low temperatures, the cryogenic meters need to be cooled down regularly.

SUMMARY

The current subject matter relates to cooling of one or more cryogenic meters that can detect a reverse flow of a liquid flowing through those one or more cryogenic meters. Related apparatus, systems, techniques, methods, and articles are also described.

In one aspect, a system includes a plurality of tubes configured to transport a plurality of fluids comprising a first fluid and a second fluid. The system further includes a first dispense valve, a second dispense valve, a first recirculation valve, and a second recirculation valve. The first dispense valve and the second dispense valve are attached to corresponding tubes. The first dispense valve and the second dispense valve are configured to open when the first fluid is dispensed from a pump to a first outlet. The first recirculation valve and the second recirculation valve are attached to respective tubes. The first recirculation valve and the second recirculation valve are configured to open when the second fluid is transported from the pump to a second outlet. The system further includes a meter attached to a tube of the plurality of tubes that has an inlet section and an outlet section. The meter is configured to measure properties of a fluid when the fluid flows through the tube. The fluid is one of the first fluid and the second fluid. The meter is configured to sense reverse flow when the second fluid flows from the outlet section to the inlet section.

In some variations, one or more of the following can be implemented individually or in any feasible combination. The system further includes a controller configured to control the opening and closing of each of the first dispense valve, the second dispense valve, the first recirculation valve, and the second recirculation valve in accordance with a software routine. The controller determines timings of the opening and the closing of the first dispense valve, the second dispense valve, the first recirculation valve, and the second recirculation valve based on the properties of the fluid measured by the meter. The software routine is executed based on the timings of the opening and the closing of the first dispense valve, the second dispense valve, the first recirculation valve, and the second recirculation valve.

The first outlet is connected to a hose that is further connected to a mechanical device that operates by using the first fluid. The controller slowly opens the second dispense valve at a predetermined rate when the first fluid is dispensed from the pump to the mechanical device via the hose. The slow opening of the second dispense valve prevents a pressure of the first fluid from exceeding a threshold value of pressure. The controller is attached to the meter. The controller monitors a flow rate of the second fluid through the first recirculation valve and the second recirculation valve. The controller opens the first dispense valve and the second dispense valve at a predetermined time after the first recirculation valve and the second recirculation valve have closed and the flow rate of the second fluid through the first recirculation valve and the second recirculation valve has become zero. The predetermined time additionally ensures that the second recirculation valve has closed. In one example, the predetermined time can be 2 seconds. The second outlet is connected to a storage tank. The first fluid can be a cryogenic liquid, and the second fluid can be a cooling liquid. The cooling liquid can be a compressed liquid existing at a temperature below associated normal saturation temperature. In some implementations, the first fluid can be same as the second fluid.

The meter can be a coriolis meter configured to operate based on a coriolis flow principle associated with the fluid flowing through the tube. The coriolis meter can include: a movable tube within the tube, an exciter, a first sensor and a second sensor, and a graphical user interface. The movable tube is configured to transport the fluid that is one of the first fluid and the second fluid. The exciter causes the movable tube to oscillate constantly. The oscillation is uniform when there is no flow through the movable tube. The oscillation is superimposed by additional twisting when the fluid flows through the movable tube. The additional twisting is caused due to an inertia of the fluid. The additional twisting causes the inlet section of the movable tube to oscillate in a direction different from a direction of oscillation of the outlet section. The first sensor and the second sensor are located at different sides of the exciter. The first sensor is located towards the inlet section of the movable tube, and the second sensor is located towards the outlet section of the movable tube. The first sensor is configured to determine: times of oscillation of a particular cross-section of the inlet section of the movable tube, and distances of the particular cross-section of the oscillating movable tube at the determined times. The second sensor is configured to determine: times of oscillation of a particular cross-section of the outlet section of the movable tube, and distances of the particular cross-section of the outlet section of the oscillating movable tube at the determined times. The determined times and the determined distances determined by the first sensor and the second sensor are used to compute a mass of the fluid flowing through the movable tube. The graphical user interface is configured to display the mass of the fluid flowing through the movable tube.

The first sensor measures a frequency of oscillation of the inlet section. The second sensor measures a frequency of oscillation of the outlet section. The frequency of oscillation of the inlet section and the frequency of oscillation of the outlet section are used to compute a density of the fluid flowing through the movable tube. The density is displayed on the graphical user interface. The graphical user interface further displays a volume of the fluid flowing through the movable tube. This volume is computed by dividing the mass of the fluid flowing through the movable tube by the density of the fluid flowing through the movable tube. The graphical user interface further displays at least one of temperature and viscosity of the fluid flowing through the movable tube.

In some alternate implementations, the meter is one of: an electromagnetic flow meter, a vortex flow meter, an ultrasonic flow meter, a thermal mass flow meter, a differential pressure flow meter, and a flow switch.

The properties of the fluid can include one or more of: a mass of the fluid flowing through the tube, a density of the fluid flowing through the tube, a volume of the fluid flowing through the tube, a temperature of the fluid flowing through the tube, and a viscosity of the fluid flowing through the tube.

The meter is configured to measure a pressure within the chamber of the meter. The pressure within the chamber is required to be at a pressure more than a first threshold in order to prevent moisture from entering the chamber and to prevent possible ignition of the fluid caused by fluid within the tube entering the chamber when the chamber is at a pressure lower than or equal to the first threshold. When the pressure is less than the first threshold, the meter generates a service alert. The service alert is displayed on a graphical user interface of the meter. When the pressure is less than a second threshold that is less than the first threshold, the meter generates an alarm sound. The meter and a flow of the plurality of fluids through the plurality of tubes automatically shut down at a predetermined time after the alarm sound. In one example, the first threshold can be 5 psig, and the second threshold can be 2 psig.

In another aspect, a structure is obtained that includes a plurality of tubes attached with a first dispense valve, a second dispense valve, a first recirculation valve, and a second recirculation valve that are closed. A tube of the plurality of tubes attached to a meter has an inlet section and an outlet section. The plurality of tubes is configured to transport a plurality of fluids. A controller connected to the meter opens the first recirculation valve and the second recirculation valve to transport a cooling liquid of the plurality of fluids via the meter from the outlet section to the inlet section in order to cool the meter. The controller closes the first recirculation valve and the second recirculation valve after a first time has elapsed since opening the first recirculation valve and the second recirculation valve. After a second time has elapsed since the closing of the first recirculation valve and the second recirculation valve, the controller opens the first dispense valve and the second dispense valve to dispense a cryogenic liquid of the plurality of fluids from a pump to a mechanical device configured to use the cryogenic liquid.

In some variations, one or more of the following can be implemented either individually or in any suitable combination. The controller closes the first dispense valve and the second dispense valve after a third time has elapsed since opening the dispense valve and the second dispense valve. In one example, the second time can be 2 seconds.

The details of one or more variations of the subject matter described herein are set forth in the accompanying drawings and the description below. Other features and advantages of the subject matter described herein will be apparent from the description, the drawings, and the claims.

DESCRIPTION OF DRAWINGS

Like reference symbols in the various drawings indicate like elements.

DETAILED DESCRIPTION

Figure 1:
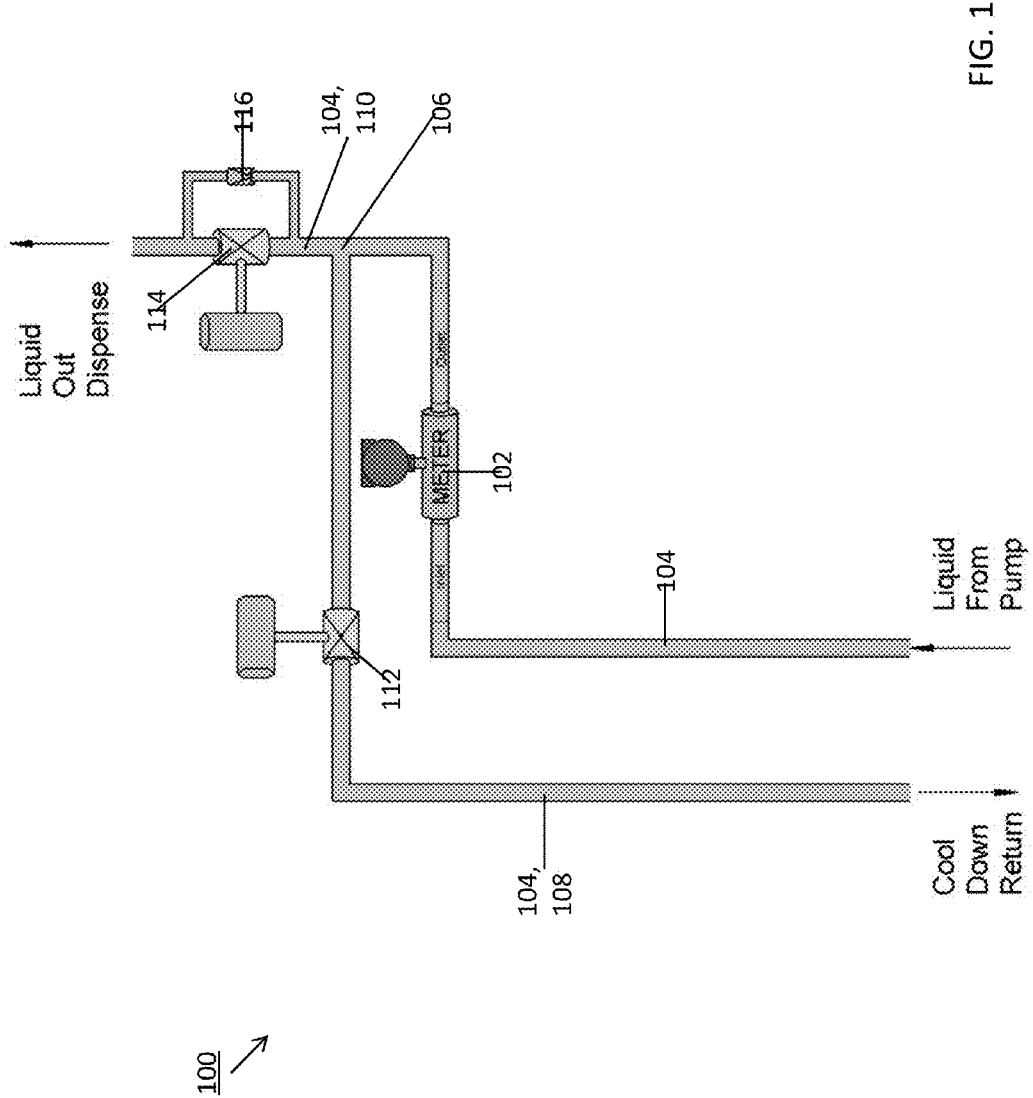
FIG. 1 illustrates a system including a meter placed in tubes configured to transport a liquid.

FIG. 1 illustrates a system 100 including a meter 102 placed in tubes 104 configured to transport a liquid. The meter 102 is used to track properties of a fluid flowing through a tube on which the meter is attached. These properties can include one or more of: a mass of the fluid flowing through the tube, a density of the fluid flowing through the tube, a volume of the fluid flowing through the tube, a temperature of the fluid flowing through the tube, a viscosity of the fluid flowing through the tube, and any other properties. Some meter codes and laws require that the liquid that has already been metered (that is, liquid that has passed through a meter 102 such that the meter 102 has determined a flow rate, duration, quantity, and/or any other parameter of the liquid) cannot be divided/diverted into multiple streams. Further, any means to facilitate such a diversion into multiple streams is prohibited by the meter codes and laws. Thus, a diversion into multiple streams can occur only before the liquid is metered by the meter 102. Accordingly, when the flowing liquid, which has already been metered by meter 102, reaches intersection 106, the flowing liquid can flow to either tube 108 or tube 110. A re-circulation valve 112 controls the flow of liquid through the tube 108. A dispense valve 114 and a thermal relief circuit 116 controls the flow of liquid through the tube 110.

A controller (not shown) connected to the meter 102 can control the opening and the closing of the re-circulation valve 112 and the dispense valve 114 in accordance with a software routine. The controller can determine timings of the opening and closing of the re-circulation valve 112 and the dispense valve 114 based on the properties of the fluid, as measured by the meter 102. The software routine can be executed based on the timings of the opening and the closing of the re-circulation valve 112 and the dispense valve 114.

The meter 102 described herein can be a meter implementing the coriolis mass flow principle, which is described in more detail below. Such a meter is also referred to as a coriolis meter herein. Although a coriolis meter is described herein, other meters can also be used in alternate implementations, such as: an electromagnetic flow meter, a vortex flow meter, an ultrasonic flow meter, a thermal mass flow meter, a differential pressure flow meter, and/or a flow switch.

Figure 2:
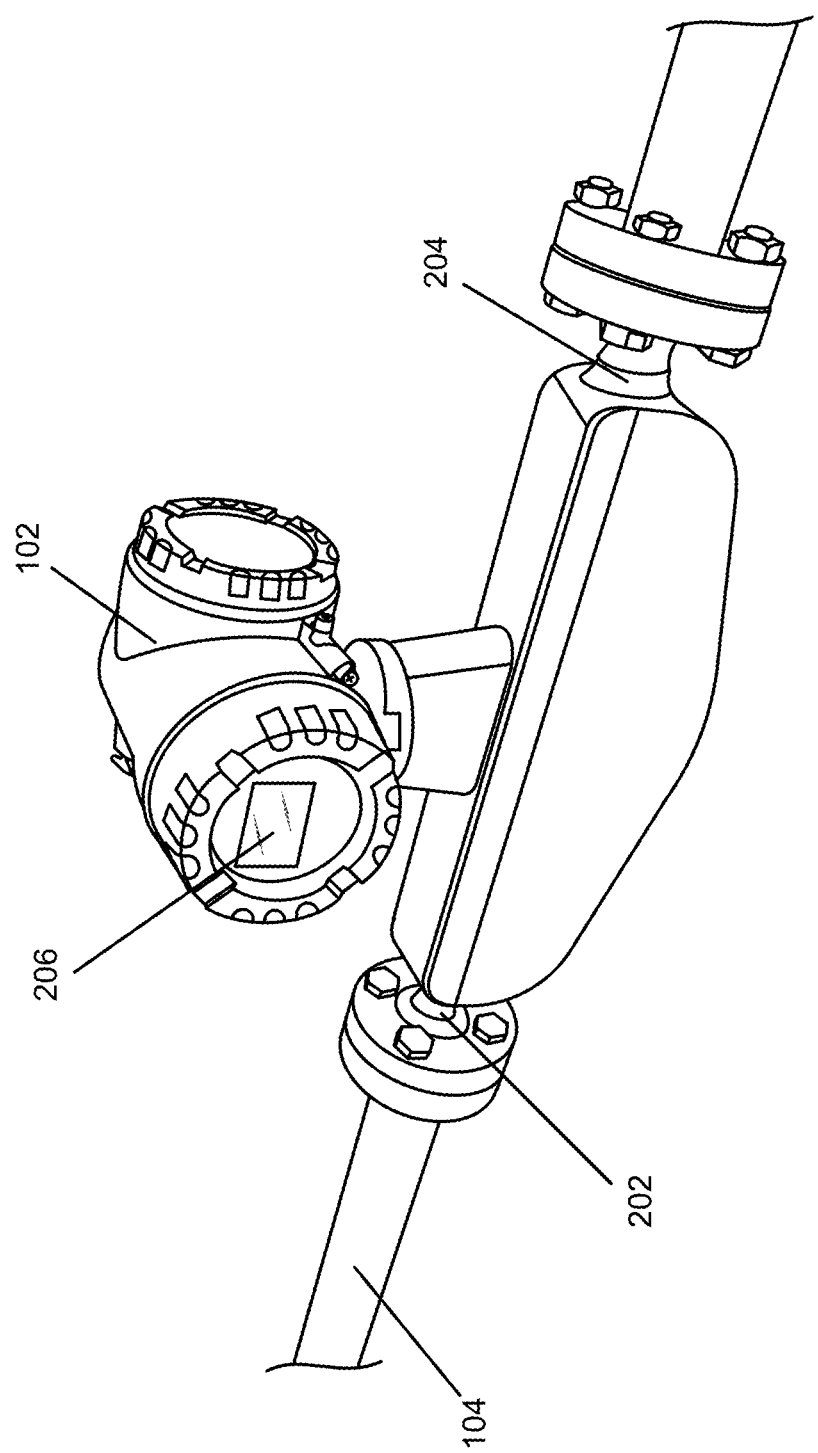
FIG. 2 illustrates one example of a meter.

FIG. 2 illustrates one example of a meter 102. The meter 102 is attached to the tube 104. The meter 102 described here is a coriolis meter that can operate based on a coriolis flow principle associated with the fluid flowing through the tube 104. The coriolis flow principle is described in detail below by FIGS. 3 and 4. The tube 104 has an inlet section 202 and an outlet section 204. The meter 102 includes a graphical user interface 206 that displays the properties of the fluid flowing through the tube 104, as measured by the meter 102. These properties can include: a mass of the fluid flowing through the tube 104, a density of the fluid flowing through the tube 104, a volume of the fluid flowing through the tube 104, a temperature of the fluid flowing through the tube 104, and a viscosity of the fluid flowing through the tube 104.

To provide for interaction with a user (for example, a technician or any other user), the graphical user interface 206 of the meter 102 can be implemented on a computing device. The graphical user interface 206 can be a cathode ray tube (CRT) device, a liquid crystal display (LCD) monitor, a light emitting diode (LED) monitor, or any other display device. The computing device can receive data from the one or more users via a keyboard, a mouse, a trackball, a joystick, or any other input device.

From a design perspective, one design of the coriolis meter 102 and the inner structure is shown, in other implementations, other designs are also possible. For example, coriolis meter 102 can be used in alternative implementations.

Some of the subject matter described herein, such as components and associated connections of the meter 102 and the controller, can be implemented in digital electronic circuitry, integrated circuitry, specially designed application specific integrated circuits (ASICs), computer hardware, firmware, software, and/or combinations thereof. These components can be executed, activated, and/or deactivated using one or more computer programs. These computer programs can be executable and/or interpreted on a programmable system. This programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device. These computer programs (also known as programs, software, software applications or code) can include machine instructions for a programmable processor, and can be implemented in a high-level procedural and/or object-oriented programming language, and/or in assembly/machine language.

Figure 3:
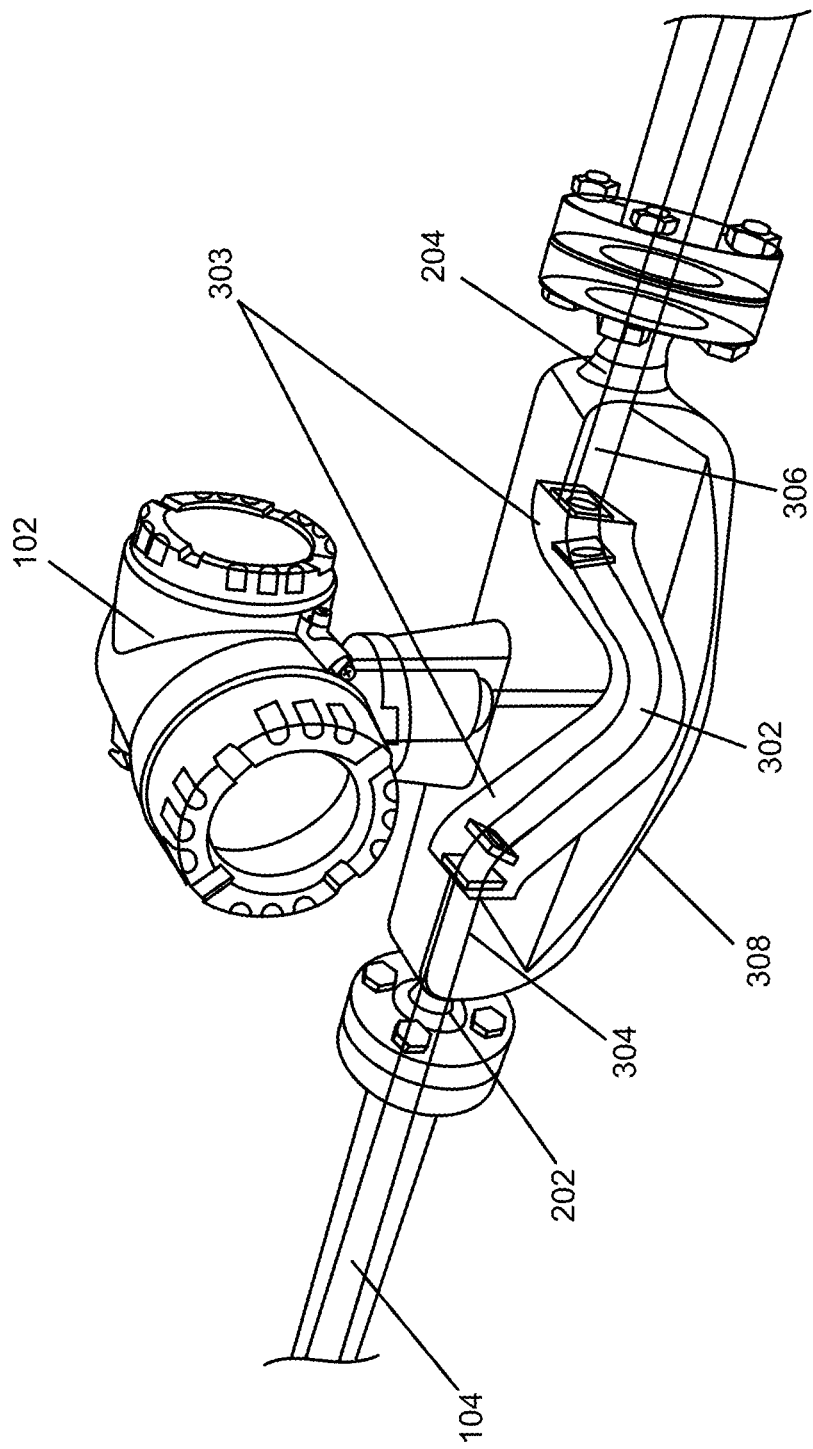
FIG. 3 illustrates the inner structure of a meter implementing the coriolis mass flow principle.

FIG. 3 illustrates the inner structure of the coriolis meter 102. The inner structure includes a movable tube 302 that is configured to oscillate in a fixed portion 303 when fluid flows through the movable tube 302. The movable tube 302 has an inlet section 304 and an outlet section 306.

The meter 102 includes a chamber 308. A conventional way of purging the chamber 308 uses a low pressure (for example, 5 psig) purge of inert gas at 72 degrees Fahrenheit. Due to a very low temperature of the flowing cryogenic liquid, the pressure of the purge drops dramatically. When this pressure drops below zero psig, a vacuum is created within the chamber. Due to this vacuum, gases outside the chamber 308 are drawn in. These drawn-in gases are undesirable, and can include: water, gases that can liquefy at cryogenic temperatures, and/or a flammable gas in the case of LNG service. The undesirable gas or moisture in the chamber 308 can cause contaminates to be formed on the tubes, thereby resulting in inaccuracies in the readings of the meter 102. Flammable gases within the chamber 308 could result in a hazardous condition. To prevent such metering inaccuracies and hazardous conditions, the pressure within the chamber 308 is required to be at a pressure more than a first threshold, such as 5 psig. When the pressure within the chamber is less than this first threshold, the meter 102 generates a service alert. In one implementation, the graphical user interface 206 of the meter 102 can display the service alert. The service alert can be one or more of: a loud sound generated by the meter 102, an email, a phone call, a text message, or any other computing device message initiated by the meter 102. When the pressure is less than a second threshold (for example, 2 psig) that is less than the first threshold (for example, 5 psig), the meter 102 can generate an alarm sound. The meter 102 and a flow of fluids through associated plurality of tubes can be automatically shut down at a predetermined time after this alarm sound. The alarm sound can be accompanied by one or more of: an email, a phone call, a text message, or any other computing device message initiated by the meter 102.

The inner structure of the meter 102 further includes an exciter, a first sensor, and a second sensor, which are described in more detail below.

Figure 4:
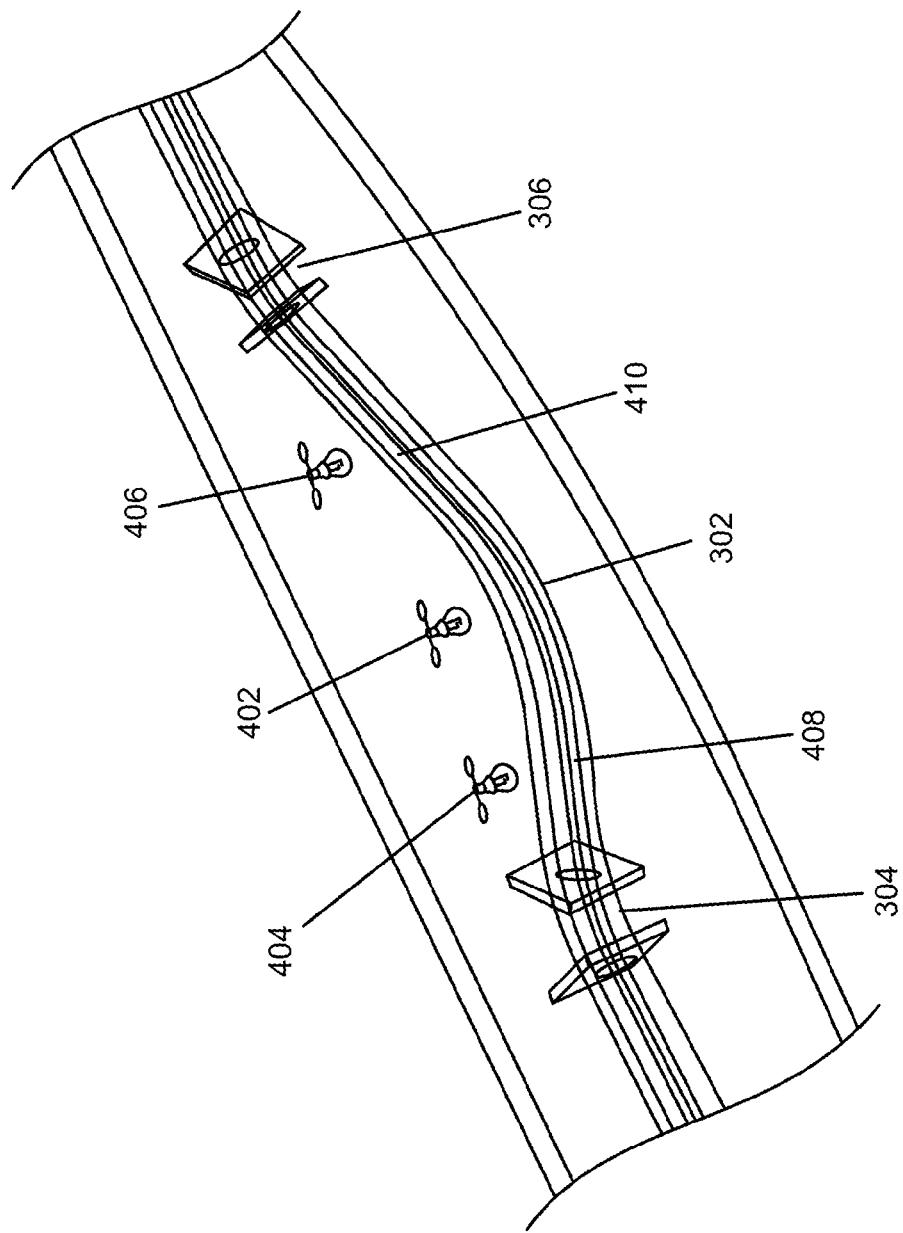
FIG. 4 illustrates an expanded view of the inner structure of the meter implementing the coriolis mass flow principle.

FIG. 4 illustrates an expanded view of the inner structure of the coriolis meter 102. The coriolis meter 102 includes an exciter 402, a first sensor 404, and a second sensor 406.

The exciter 402 causes the movable tube 302 to oscillate constantly. The oscillation is uniform when there is no flow through the movable tube 302. This uniform oscillation is superimposed by additional twisting when fluid flows through the movable tube 302. The additional twisting is caused due to inertia of the fluid that is flowing within the movable tube 302. The additional twisting causes the inlet section 304 of the movable tube 302 to oscillate in a direction different from a direction of oscillation of the outlet section 306 of the movable tube 302.

The first sensor 404 is located towards the inlet section 304 of the movable tube 302, and the second sensor 406 is located towards the outlet section 306 of the movable tube 302. The first sensor 404 can determine: times of oscillation of a particular cross-section 408 of the inlet section 304 of the movable tube 302, and distances of the particular cross-section 408 from the first sensor 404 at the determined times. The second sensor 406 can determine: times of oscillation of a particular cross-section 410 of the outlet section 306 of the movable tube 302, and distances of the particular cross-section 410 from the second sensor 406 at the determined times. These determined times and the determined distances are used to compute a mass of the fluid flowing through the movable tube. The graphical user interface 206 can display this mass of the fluid flowing through the movable tube 302.

The first sensor 404 further measures a frequency of oscillation of the inlet section 304. The second sensor 406 further measures a frequency of oscillation of the outlet section 306. The frequency of oscillation of the inlet section 304 and the frequency of oscillation of the outlet section 306 are used to compute a density of the fluid flowing through the movable tube 302. The graphical user interface 206 can further display the density.

The graphical user interface 206 can also display a volume of the fluid flowing through the movable tube 302. This volume is computed by dividing the mass of the fluid flowing through the movable tube 302 by the density of the fluid flowing through the movable tube 302.

The meter 102 can further measure and display, on the graphical user interface 206, at least one of temperature and viscosity of the fluid flowing through the movable tube 302.

Figure 5:
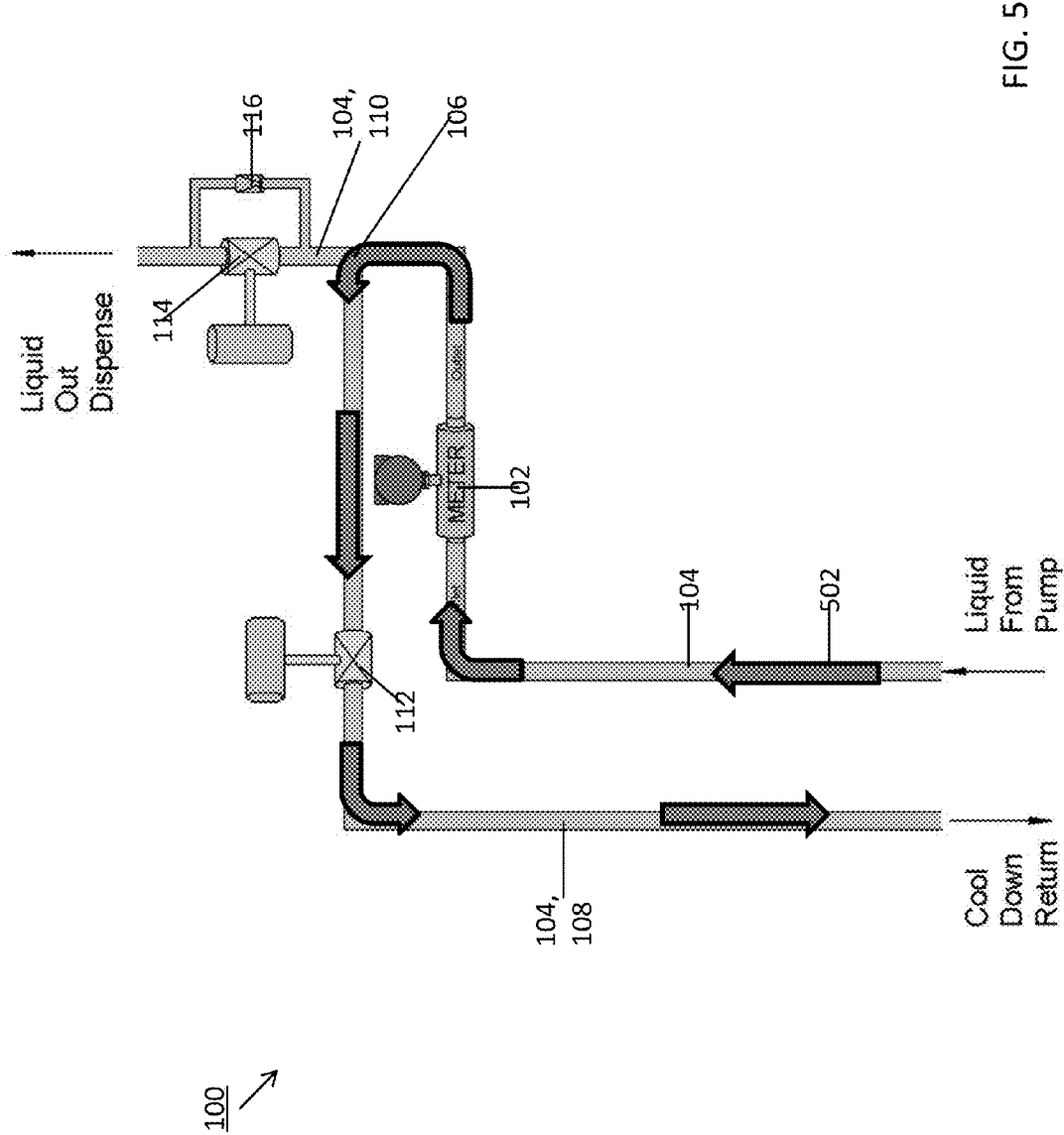
FIG. 5 illustrates the system performing a cooling of the meter by a cooling liquid.

FIG. 5 illustrates the system 100 performing a cooling of the meter 102 by a cooling liquid 502. The cooling liquid 502 can be a compressed liquid existing at a temperature below associated normal saturation temperature. In some implementations, the cooling liquid 502 can be a cryogenic liquid. The meter 102 can measure and display the properties of the cooling liquid 502. These properties can include: a mass of the cooling liquid 502 flowing through the tube 104, a density of the cooling liquid 502 flowing through the tube 104, a volume of the cooling liquid 502 flowing through the tube 104, a temperature of the cooling liquid 502 flowing through the tube 104, and a viscosity of the cooling liquid 502 flowing through the tube 104. Because a cooling of the meter 102 is being performed rather than a dispensing of a cryogenic liquid, a controller (not shown) connected to the meter 102 closes the dispense valve 114 to block the flow of the cooling liquid 502 in the tube 110. The flow of the cooling liquid 502 through the meter 102 cools down the meter 102. The controller opens the re-circulation valve 112 to allow the cooling liquid 502 to pass through. The controller can use a timer to control the closing of the dispense valve 114 and the opening of the re-circulation valve 112 based on the properties of the liquids flowing through the meter 102, as measured by the meter 102.

The cryogenic liquids described herein can be one or more of: liquefied natural gas (LNG), argon, helium, hydrogen, nitrogen, oxygen, methane, and any other cryogenic liquid.

Figure 6:
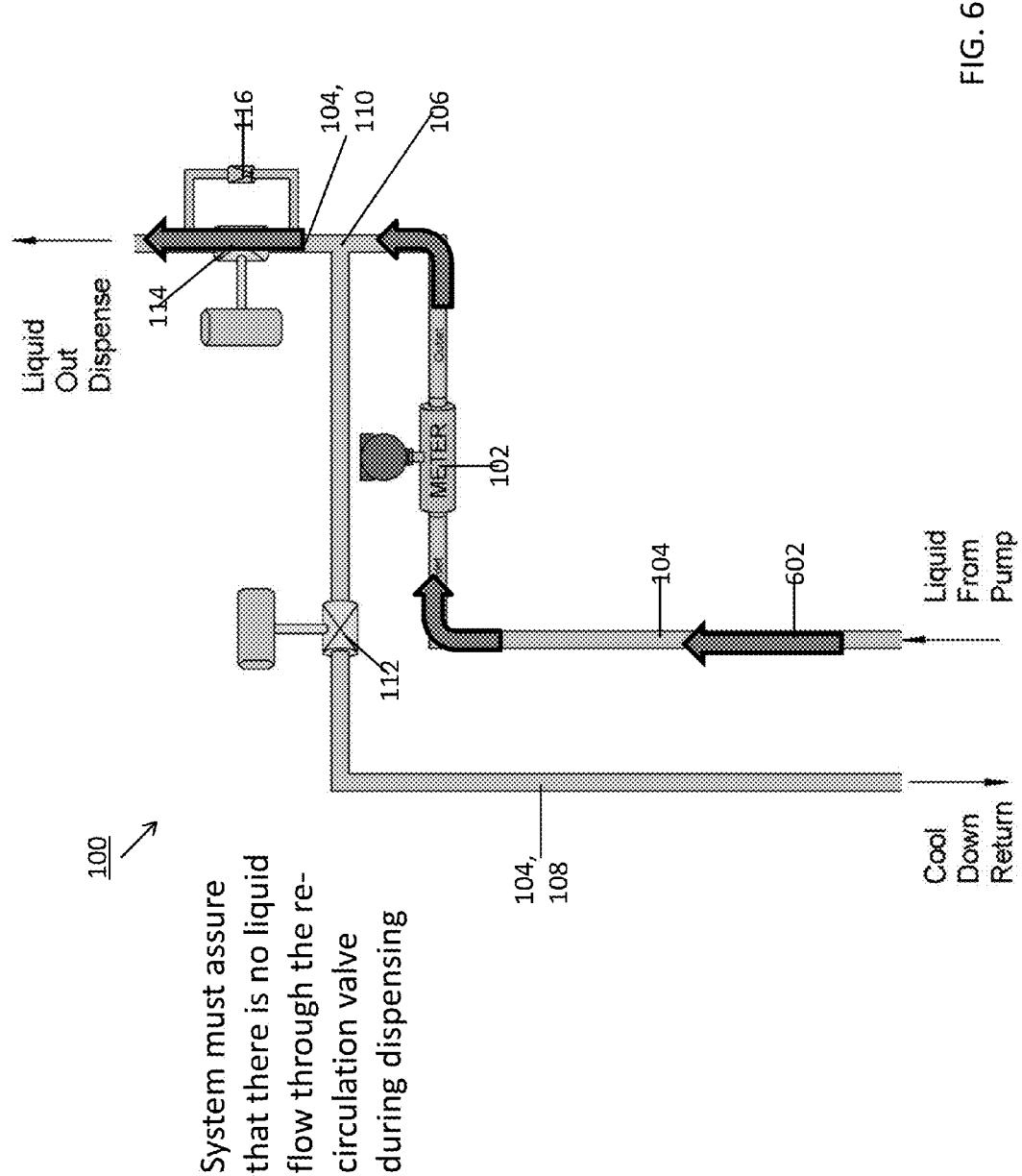
FIG. 6 illustrates the system performing a dispensing of a cryogenic liquid from a pump to an external device.

FIG. 6 illustrates the system 100 performing a dispensing of a cryogenic liquid 602 from a pump to an external device, such as a mechanical device that may operate using cryogenic liquid 602. In some implementations, the cryogenic liquid 602 can be same as the cooling liquid 502. The cryogenic liquid 602 is metered by the meter 102. Because a dispensing of a cryogenic liquid is being performed rather than a cooling of the meter 102, a controller (not shown) closes the re-circulation valve 112 to block the flow of the cryogenic liquid 602 in the tube 108. The controller opens the dispense valve 114 to allow the cryogenic liquid to flow through the tube 110. The controller controls the closing of the re-circulation valve 112 and the opening of the dispense valve 114 based on properties of fluids flowing through the meter 102, as measured by the meter 102.

Figure 7:
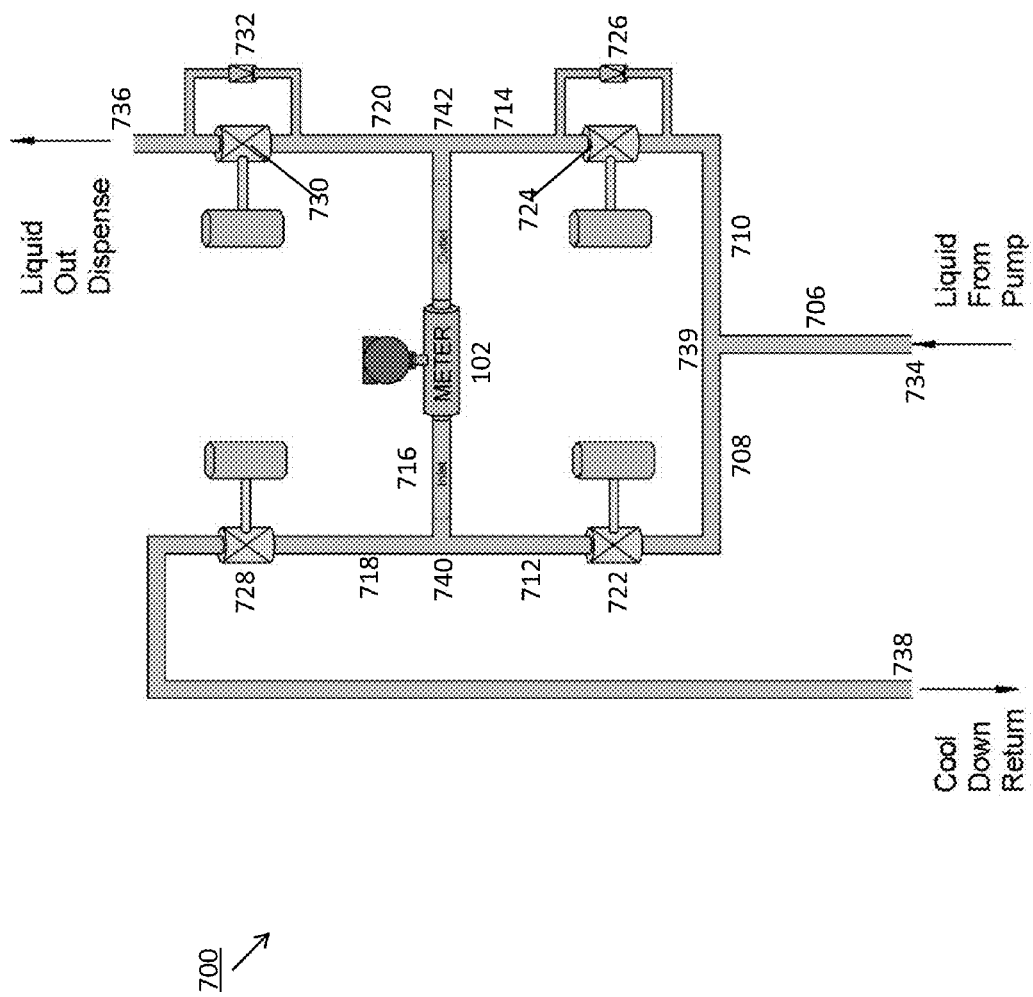
FIG. 7 illustrates a system including a meter placed in tubes that are configured to transport a liquid.

FIG. 7 illustrates a system 700 including a meter 102 placed in tubes 706, 708, 710, 712, 714, 716, 718, and 720 that are configured to transport a liquid. A first dispense valve 722 controls the flow of liquid through the tube 712. A first re-circulation valve 724 and a first thermal relief circuit 726 control the flow of liquid through the tube 714. A second re-circulation valve 728 controls the flow of liquid through the tube 718. A second dispense valve 730 and a second thermal circuit 732 controls the flow of liquid through the tube 720. A controller (not shown) connected to the meter 102 can open or close any of the valves 722, 724, 728, and 730 automatically. In alternate implementations, any of the valves 722, 724, 728, and 730 can be opened and/or closed manually.

A controller (not shown) connected to the meter 102 can control the opening and the closing of the valves 722, 724, 728, and 730 in accordance with a software routine. The controller can determine timings of the opening and closing of the valves 722, 724, 728, and 730 based on the properties of the liquid flowing through the tube, as measured by the meter 102. The software routine can be executed based on the timings of the opening and the closing of these valves 722, 724, 728, and 730. In alternate implementations, the opening and closing of the valves 722, 724, 728, and/or 730 can occur manually.

The tube 706 has an inlet 734. The inlet 734 can be connected to a pump that pumps the cooling liquid 502 or the cryogenic liquid 602 for transportation in the corresponding tubes. The tube 720 has a first outlet 736, which can be connected to a hose that is further connected to an external mechanical device. The external mechanical device may operate by using cryogenic liquid dispensed to the first outlet 734 from the pump connected at the inlet 734. The tube 708 has a second outlet 738, which can be connected to a storage vessel that stores cooling liquid that has been used to cool the meter 102.

The tubes 706, 708, and 710 form a tee junction 739. The tubes 712, 816, and 718 form a tee junction 740. The tubes 714, 716, and 720 form a tee junction 742. When cryogenic liquid or cooling liquid flows through these tubes, such a liquid is at a high pressure, which prevents a diversion of the liquid at these tee junctions towards a closed valve. More specifically, diversion is not possible due to the fact that a flowing liquid cannot flow from low pressure to high pressure. Tube 710 is at a pressure higher than the pressure in tube 714.

The system 700 can be more advantageous than the system 100, as the system 700 allows cooling of the meter to be performed in reverse flow. For example, the meter 102 in the system 100 cannot differentiate between a recirculation flow and a dispensing flow, as both these flows pass in a same direction through the meter 102. Thus, to differentiate between recirculation flow and dispensing flow, the system 100 requires each flow to stop completely before a different flow can be started. However, if a flow is stopped completely before opening the recirculation valve, the pressure of the flowing liquid in the system 100 rapidly rises. This rise in pressure can cause undesirable ghost flows of the liquid. Furthermore, if the system 100 simply closes the valves 112 and 114 and starts a ramp down of the pump without allowing a flow path for the liquid to flow, the pump can get damaged. These scenarios are dependent on timing of the closing of the dispense valve 114. On the other hand, the system 700 creates a soft end for dispensing when the dispense valves 722 and 730 close and the recirculation valves 724 and 728 open. This soft stop creates a distinct end to the metering and allows the pump to ramp down properly.

Figure 8:
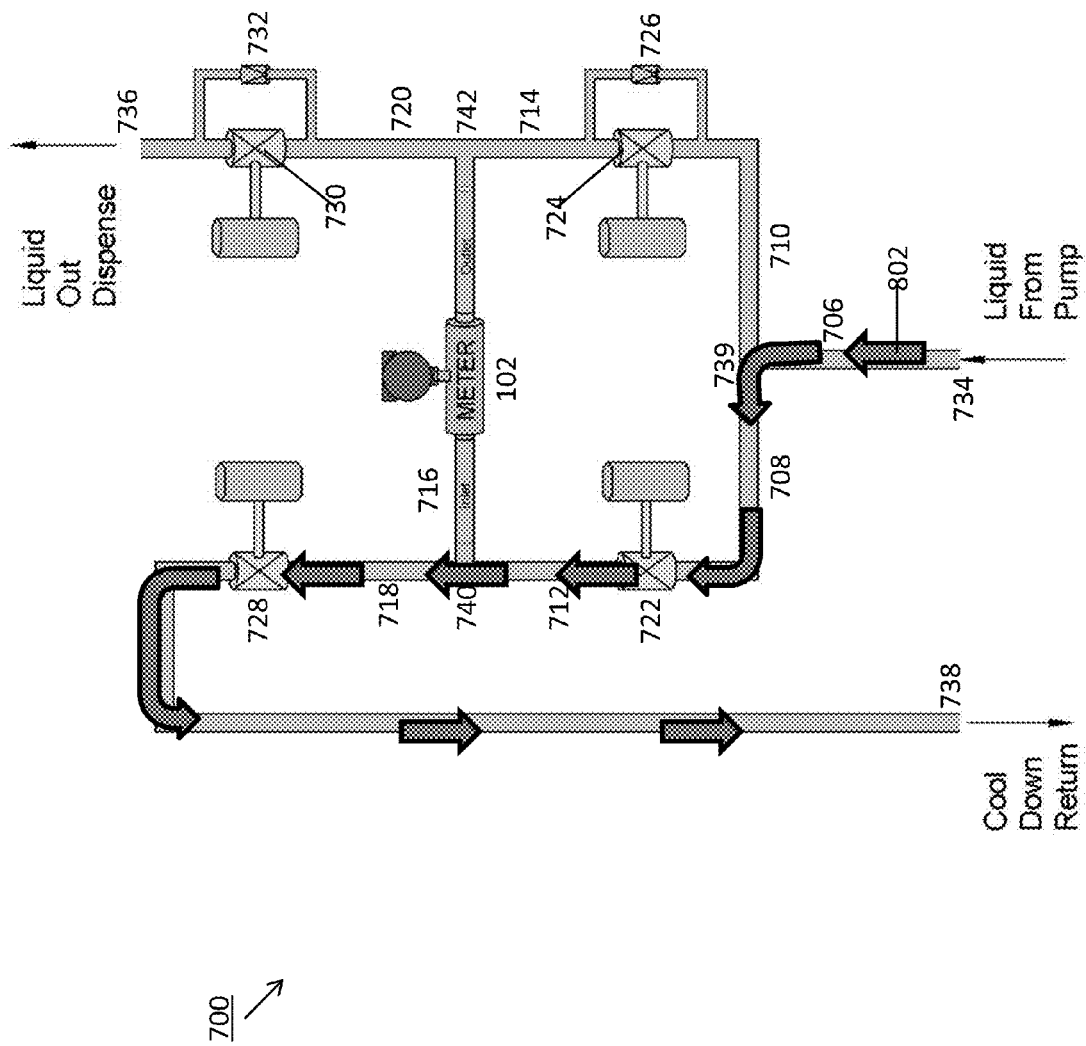
FIG. 8 illustrates the system performing a cooling of tubes by a cooling liquid.

FIG. 8 illustrates the system 700 performing a cooling of tubes 706, 708, 712, and 718 by a cooling liquid 802. For the shown flow of the cooling liquid 802, a controller (not shown) connected to the meter 102 can open the first dispense valve 722 and the second re-circulation valve 728 while keeping the first re-circulation valve 724 and the second dispense valve 730 closed. In some implementations, the meter 102 may not allow the cooling liquid 802 to flow through by blocking the tube 716. In some implementations, the cooling liquid 802 can be same as the cooling liquid 502.

Figure 9:
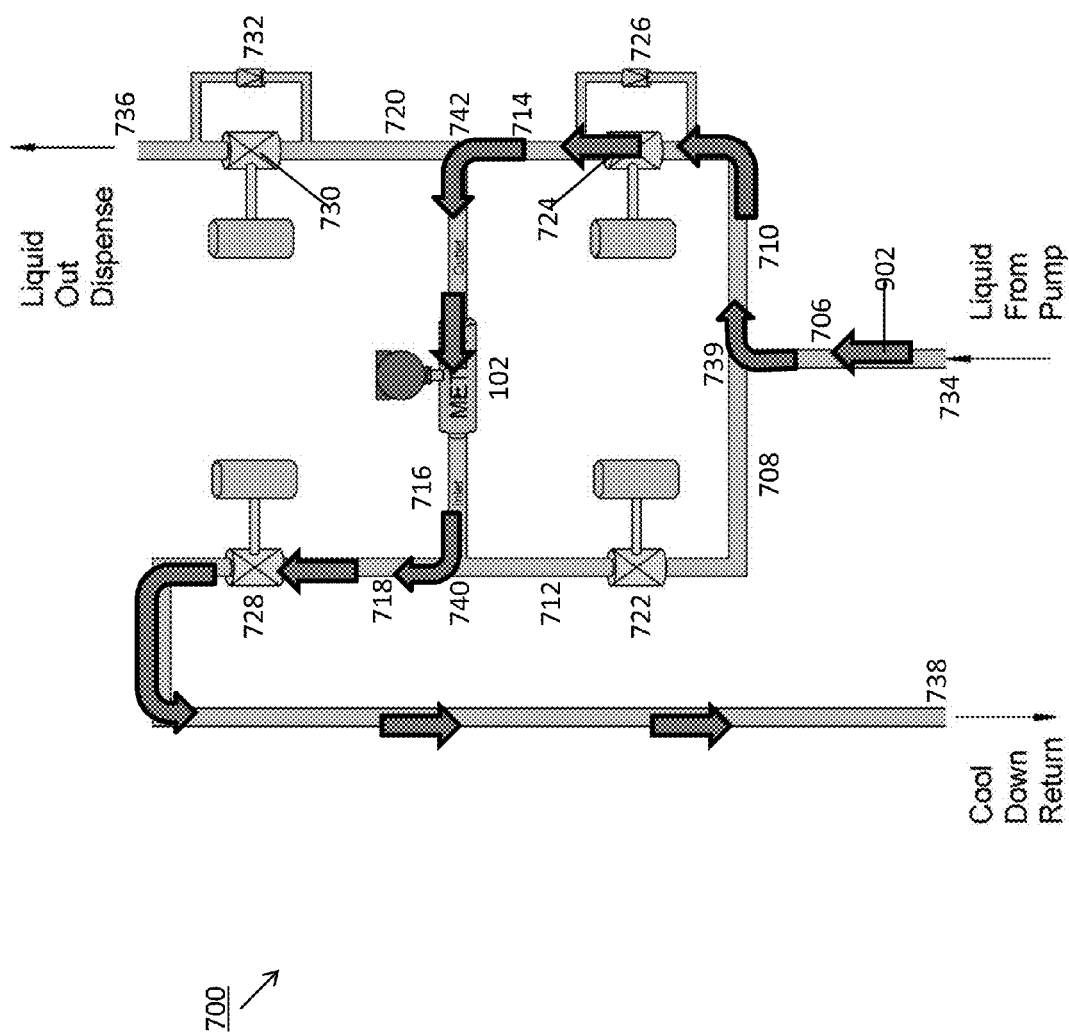
FIG. 9 illustrates the system performing a cooling of the meter by a cooling liquid.

FIG. 9 illustrates the system 700 performing a cooling of the meter 102 by a cooling liquid 902. The meter 102 can include a sensing device that can sense the direction of flow through the meter. The sensing device can be a flow direction sensor. Thus, the meter 102 can determine a reverse liquid flow (that is, liquid flow from an outlet section of the meter 102 to an inlet section of the meter 102) through the meter 102. To allow the cooling liquid to pass through the path shown, a controller (not shown) connected to the meter 102 can open the first re-circulation valve 724 and the second re-circulation valve 728 while keeping the first dispense valve 722 and the second dispense valve 730 closed. In some implementations, the cooling liquid 902 can be same as the cooling liquid 502 and/or the cooling liquid 802. The controller can monitor a flow rate of the cooling liquid 902 through the first recirculation valve 724 and the second recirculation valve 728.

Figure 10:
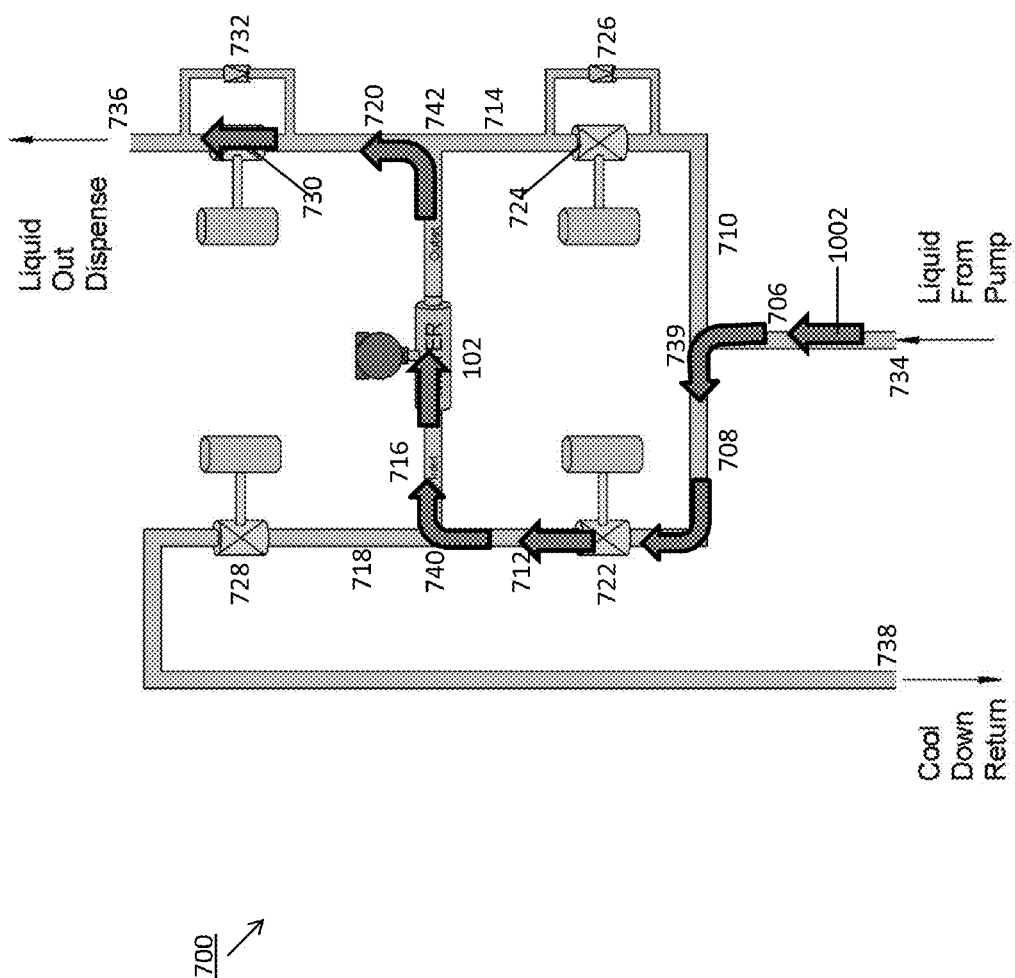
FIG. 10 illustrates the system performing a dispensing of a cryogenic liquid from a pump to an external device.

FIG. 10 illustrates the system 700 performing a dispensing of a cryogenic liquid 1002 from a pump to an external device. To allow the cryogenic liquid 1002 to pass through the path shown, a controller (not shown) connected to the meter 102 can open the first dispense valve 722 and the second dispense valve 730 while keeping the first re-circulation valve 724 and the second re-circulation valve 728 closed.

The controller opens the first dispense valve 722 and the second dispense valve 730 at a predetermined time (for example, 2 seconds) after the first recirculation valve 724 and the second recirculation valve 728 have closed and the flow rate of the cooling liquid 902 through the first recirculation valve 724 and the second recirculation valve 728 has become zero. The predetermined time of 2 seconds additionally ensures that the second recirculation valve 728 has closed.

The dispense hose connected to the outlet 736 is typically warm, and cannot be cooled. This hose is at a low pressure when the dispense valve 730 is opened. When the cryogenic liquid 1002 enters the warm empty hose, the flowing cryogenic liquid 1002 expands and quickly warms. This can result in high pressures in the hose. Higher pressures than the pump can cause the flow of the cryogenic liquid 1002 to stop. To prevent this stopping of the flow of cryogenic liquid 1002, the cryogenic liquid 1002 is required to be sub-cooled and the dispense valve 730 is required to open slowly.

In some implementations, the cryogenic liquid 1002 can be same as the cryogenic liquid 902. For liquid 1002 to flow, there must be pressure drop. These pressure conditions make it impossible for metered liquid to be diverted at tee 742. For example, even when the valve 724 is opened either by damaging or by an unscrupulous activity, the flow of the cryogenic liquid 1002 is not diverted at tee 739 towards tube 710 or at the tee junction 740 towards tube 718 when the first re-circulation valve 724 and the second re-circulation valve 728 are closed.

Figure 11:
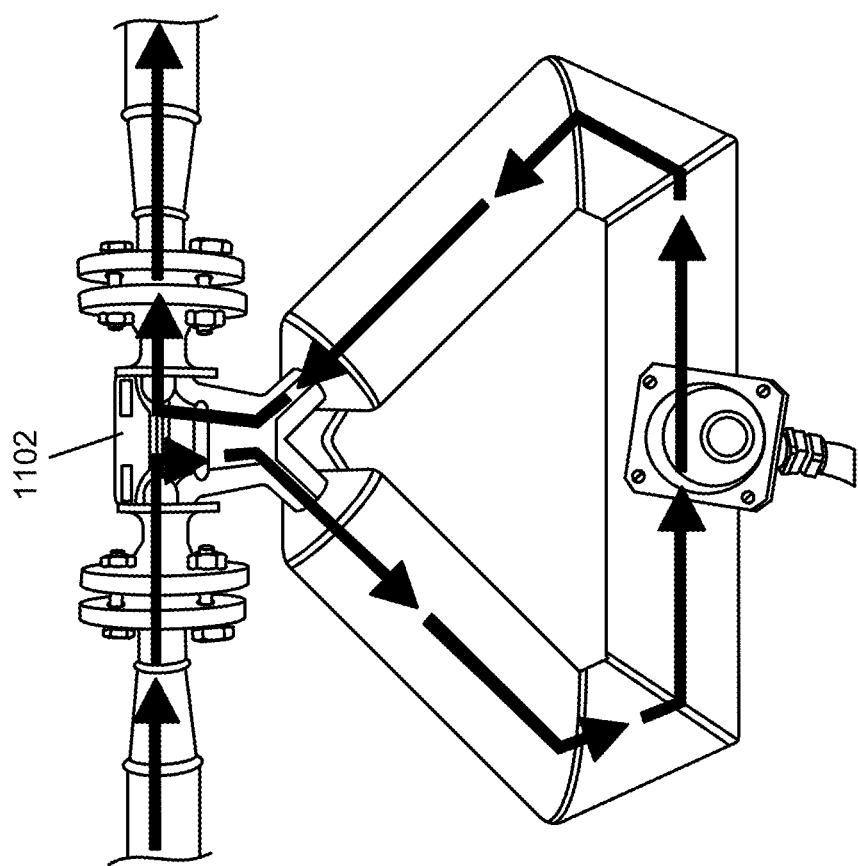
FIG. 11 illustrates an alternate implementation of the meter implementing the coriolis mass flow principle.

FIG. 11 illustrates an alternate implementation of a coriolis meter 1102. The arrows illustrate a direction of forward flow through the coriolis meter 1102. If the arrows are reversed, the reversed arrows illustrate a direction of reverse flow through the meter 1102. The coriolis meter 1102 is configured to detect the direction of flow (that is, whether the flow is forward flow or reverse flow).

Although a few variations have been described in detail above, other modifications can be possible. For example, the logic flows described herein do not require the particular order shown, or sequential order, to achieve desirable results. Other embodiments may be within the scope of the following claims.

What is claimed is:

1. A system comprising:
a plurality of tubes configured to transport a plurality of fluids comprising a first fluid and a second fluid, said plurality of tubes including a single liquid inlet, a single liquid dispensing outlet and a single cool down return outlet for the plurality of tubes, said liquid inlet configured to receive streams of the first and second fluids from a pump;
a first dispense valve attached to a first section of the plurality of tubes and a second dispense valve attached to a second section of the plurality of tubes that is downstream of the first section of the plurality of tubes, the first dispense valve and the second dispense valve configured so that when the first dispense valve and the second dispense valve are open, the first fluid is dispensed from the liquid inlet to the liquid dispensing outlet;
a first recirculation valve attached to a third section of the plurality of tubes and a second recirculation valve attached to a fourth section of the plurality of tubes that is downstream of the third section of the plurality of tubes, the first recirculation valve and the second recirculation valve configured so that when the first recirculation valve and the second recirculation valve are open, the second fluid is transported from the liquid inlet to the cool down return outlet;
a meter attached to a tube of the plurality of tubes that has an inlet section and an outlet section, the meter configured to measure properties of a fluid flowing through the meter in a first direction that is from the inlet section to the outlet section, the meter configured to sense reverse flow when the second fluid flows in a second direction that is from the outlet section to the inlet section; and
said plurality of tubes configured so that when the first dispense valve and the second dispense valve are closed and the first recirculation valve and the second recirculation valve are open, the second fluid flows through the meter in the second direction after flowing through the liquid inlet, and when the first dispense valve and the second dispense valve are open and the first recirculation valve and the second recirculation valve are closed, the first fluid flows through the meter in the first direction after flowing through the liquid inlet.

2. The system of claim 1, further comprising:
a controller configured to control the opening and closing of each of the first dispense valve, the second dispense valve, the first recirculation valve, and the second recirculation valve in accordance with a software routine.

3. The system of claim 2, wherein:
the controller determines timings of the opening and the closing of the first dispense valve, the second dispense valve, the first recirculation valve, and the second recirculation valve based on the properties of the fluid measured by the meter; and
the software routine is executed based on the timings of the opening and the closing of the first dispense valve, the second dispense valve, the first recirculation valve, and the second recirculation valve.

4. The system of claim 2, wherein:
the controller is configured to slowly open the second dispense valve at a predetermined rate when the first fluid is dispensed from the liquid outlet, the slow opening of the second dispense valve preventing a pressure of the first fluid from exceeding a threshold value of pressure.

5. The system of claim 2, wherein the controller is attached to the meter.

6. The system of claim 2, wherein the controller monitors a flow rate of the second fluid through the first recirculation valve and the second recirculation valve, the controller opening the first dispense valve and the second dispense valve at a predetermined time after the first recirculation valve and the second recirculation valve have closed and the flow rate of the second fluid through the first recirculation valve and the second recirculation valve has become zero.

7. The system of claim 6, wherein the controller additionally ensures that the second recirculation valve has closed.

8. The system of claim 1, wherein the second outlet is connected to a storage tank.

9. The system of claim 1, wherein:
the first fluid is a cryogenic liquid; and
the second fluid is a cooling liquid.

10. The system of claim 9, wherein the cooling liquid is a compressed liquid existing at a temperature below associated normal saturation temperature.

11. The system of claim 1, wherein the first fluid is same as the second fluid.

12. The system of claim 1, wherein the meter is a coriolis meter configured to operate based on a coriolis flow principle associated with the fluid flowing through the tube that is attached to the meter, the meter comprising:
a movable tube within the tube, the movable tube configured to transport the fluid that is one of the first fluid and the second fluid;
an exciter that causes the movable tube to oscillate constantly, the oscillation being uniform when there is no flow through the movable tube, the oscillation being superimposed by additional twisting when the fluid flows through the movable tube, the additional twisting being caused due to an inertia of the fluid, the additional twisting causing the inlet section of the movable tube to oscillate in a direction different from a direction of oscillation of the outlet section;
a first sensor and a second sensor at different sides of the exciter, the first sensor being located towards the inlet section of the movable tube and the second sensor being located towards the outlet section of the movable tube, the first sensor configured to determine times of oscillation of a particular cross-section of the inlet section of the movable tube and distances of the particular cross-section of the oscillating movable tube at the determined times, the second sensor configured to determine times of oscillation of a particular cross-section of the outlet section of the movable tube and distances of the particular cross-section of the outlet section of the oscillating movable tube at the determined times, the determined times and the determined distances determined by the first sensor and the second sensor being used to compute a mass of the fluid flowing through the movable tube; and
a graphical user interface configured to display the mass of the fluid flowing through the movable tube.

13. The system of claim 12, wherein the first sensor measures a frequency of oscillation of the inlet section, the second sensor measures a frequency of oscillation of the outlet section, the frequency of oscillation of the inlet section and the frequency of oscillation of the outlet section being used to compute a density of the fluid flowing through the movable tube, the density being displayed on the graphical user interface.

14. The system of claim 13, wherein the graphical user interface further displays a volume of the fluid flowing through the movable tube, the volume being computed by dividing the mass of the fluid flowing through the movable tube by the density of the fluid flowing through the movable tube.

15. The system of claim 12, wherein the graphical user interface further displays at least one of temperature and viscosity of the fluid flowing through the movable tube.

16. The system of claim 1, wherein the meter is one of an electromagnetic flow meter, a vortex flow meter, an ultrasonic flow meter, a thermal mass flow meter, a differential pressure flow meter, and a flow switch.

17. The system of claim 1, wherein the properties of the fluid flowing through the meter include one or more of: a mass, a density, a volume, a temperature, and a viscosity.

18. The system of claim 1, wherein:
the meter is configured to measure a pressure within a chamber of the meter, the pressure within the chamber required to be at a pressure more than a threshold in order to prevent moisture from entering the chamber;
when the pressure is less than the threshold, the meter generates a service alert, the service alert being displayed on a graphical user interface of the meter.

19. The system of claim 18, wherein:
the first threshold is 5 psig; and
the second threshold is 2 psig.

20. The system of claim 1 wherein the plurality of tubes are configured so that when the first dispense valve and the second recirculation valve are open and the second dispense valve and the first recirculation valve are closed, the second fluid flows from the liquid inlet to the cool down return outlet without flowing through the meter.

* * * * *

UNITED STATES PATENT AND TRADEMARK OFFICE
CERTIFICATE OF CORRECTION

PATENT NO. : 10,288,367 B2
APPLICATION NO. : 14/208128
DATED : May 14, 2019
INVENTOR(S) : Paul Drube Page 1 of 1

It is certified that error appears in the above-identified patent and that said Letters Patent is hereby corrected as shown below:

On the Title Page

The portion of (73) Assignee reading "Chart, Inc." should read --Chart Inc.--

Signed and Sealed this
Ninth Day of July, 2019

Andrei Iancu
*Director of the United States Patent and Trademark Office*